(12) United States Patent
Lee et al.

(10) Patent No.: US 12,532,364 B2
(45) Date of Patent: Jan. 20, 2026

(54) INTEROPERABILITY OF COMMUNICATION DEVICES

(71) Applicant: Marvell Asia Pte Ltd, Singapore (SG)

(72) Inventors: Whay Sing Lee, Milpitas, CA (US);
Lenin Kumar Patra, Dublin, CA (US)

(73) Assignee: Marvell Asia Pte Ltd, Singapore (SG)

( * ) Notice: Subject to any disclaimer, the term of this patent is extended or adjusted under 35 U.S.C. 154(b) by 342 days.

(21) Appl. No.: 18/142,574

(22) Filed: May 2, 2023

(65) Prior Publication Data
US 2023/0354445 A1    Nov. 2, 2023

Related U.S. Application Data

(60) Provisional application No. 63/337,251, filed on May 2, 2022.

(51) Int. Cl.
*H04W 76/10* (2018.01)

(52) U.S. Cl.
CPC .................................. *H04W 76/10* (2018.02)

(58) Field of Classification Search
CPC ........................................................ H04W 76/10
USPC ........................................................ 370/310
See application file for complete search history.

(56) References Cited

U.S. PATENT DOCUMENTS

| | | | |
|---|---|---|---|
| 2003/0161348 A1 | 8/2003 | Mills | |
| 2017/0245226 A1* | 8/2017 | Chow | .................. H04W 52/50 |
| 2019/0327146 A1* | 10/2019 | Mahadevan | ........ H04L 41/0853 |
| 2020/0145285 A1* | 5/2020 | Krishnan | ............ H04L 41/0816 |
| 2020/0412586 A1* | 12/2020 | Mcloughlin | ........ G06F 13/4282 |
| 2021/0143972 A1 | 5/2021 | Mann | |
| 2022/0140908 A1* | 5/2022 | J B | ........................ H04B 10/27 |
| | | | 398/25 |

OTHER PUBLICATIONS

IEEE Std 802.Mar. 2022, "IEEE Standard for Ethernet," Inst. of Electrical and Electronics Engineers (IEEE), Clauses 72-73, pp. 3057-3129 (May 13, 2022).
International Search Report and Written Opinion for PCT Application No. PCT/IB2023/0207537, mailed Jul. 7, 2023 (14 pages).
Lusted et al., "CI 136.8.11 Link Training Issue (comment #1) Update," available at https://grouper.ieee802.org/3/ck/public/20_10/lusted_3ck_02_1020.pdf, 21 pages (2020).

(Continued)

*Primary Examiner* — Nicholas R Taylor
*Assistant Examiner* — Chong G Kim

(57) ABSTRACT

In a communication network operating according to a communication protocol that defines a link establishment procedure having i) a negotiating procedure and ii) a training procedure, a first communication device performs the link establishment procedure with a second communication device. During the negotiating procedure, the first communication device negotiates one or more new parameter values for the link establishment procedure that are different than one or more mandated parameter values specified by the communication protocol. During the link establishment procedure, the first communication device uses the one or more new parameter values instead of using the one or more mandated parameter values specified by the communication protocol.

20 Claims, 3 Drawing Sheets

(56) References Cited

OTHER PUBLICATIONS

Sun et al., "Comparison of KR/CR Reference Receivers," Inst. of Electrical and Electronics Engineers (IEEE), IEEE P802.3ck Task Force, Ad Hoc, 19 pages (2018).
"IEEE 802.3ap—Proposal for 10Gbps Serial Backplane PHY using Unified Signaling," Inst. of Electrical and Electronics Engineers (IEEE), available at https://grouper.ieee.org/groups/802/3/ap/public/Nov. 04/gaither_01_1104.pdf, 27 pages (2004).
"Schedule 3—25G & 50G Specification," 25/50 Gigabit Ethernet Consortium, 32 pages (2017).

\* cited by examiner

During a negotiation procedure, first communication device communicates with a second communication device to negotiate one or more new timeout values for a link establishment procedure, the one or more new timeout values being different than the one or more corresponding mandated timeout values specified by a communication protocol 304

First communication device uses, during the link establishment procedure, the one or more new timeout values instead of using the one or more corresponding mandated timeout values specified by the communication protocol 308

INTEROPERABILITY OF COMMUNICATION DEVICES

CROSS REFERENCES TO RELATED APPLICATIONS

This application claims the benefit of U.S. Provisional Patent App. No. 63/337,251, entitled "Extended Auto Negotiation and Link Training," filed on May 2, 2022, the disclosure of which is expressly incorporated herein by reference in its entirety.

FIELD OF TECHNOLOGY

This disclosure relates generally to network communications, and more particularly to negotiation and training of communication links.

BACKGROUND

Typically, communication devices perform a link training procedure as part of establishing a communication link between the communication devices. Link training includes exchanging training signals with another communication device (a link partner), and using the training signals to adjust parameters of components of the communication devices, such as pre-compensation filters, equalizers, echo cancellers, etc., to optimize the components for communications via the link. After the training procedure is completed and the component parameters have been adjusted, communication of data via the communication link can begin.

Additionally, some communication protocols define a negotiation procedure that permits communication devices to exchange capability information and to choose communication parameters to be used when communicating via the communication link, such as transmission speed, modulation parameters, error correction encoding parameters, etc.

The Institute for Electrical and Electronics Engineers (IEEE) 802.3 Standard defines an auto-negotiation and link training (ANLT) procedure for Ethernet. The IEEE 802.3 defines the ANLT to include two sequential phases: an auto-negotiation phase (AN) followed by a Link Training phase (LT).

The AN permits Ethernet devices with different capabilities to communicate with one another in order to interoperate. The AN includes two sequential sub-phases: a base page exchange, followed by an optional next page exchange. During the base page exchange, two link partners exchange information about the capabilities of each link partner, to agree on a best signaling and data encoding mode (e.g., 4×25G=100G Ethernet, vs 4×50G=200G Ethernet). The next page exchange may be used to facilitate additional information exchange. The IEEE 802.3 Standard does not specifically define the contents of the next page, leaving it to be vendor-proprietary.

The LT phase involves exchanging training signals and adjusting component parameters, as discussed above.

SUMMARY

In an embodiment, a first communication device is configured to operate in a communication network according to a communication protocol that defines a link establishment procedure that includes i) a negotiating procedure and ii) a training procedure, wherein the communication protocol specifies mandated parameter values that are to be used for the link establishment procedure. The first communication device comprises: physical layer (PHY) circuitry having a transceiver that is configured to transmit and receive via a communication link; a negotiation controller; and a training controller. The negotiation controller is configured to control the PHY circuitry to i) perform the negotiation procedure, and ii) during the negotiating procedure, control the PHY circuitry to communicate with a second communication device via the communication link to negotiate one or more new parameter values for the link establishment procedure that are different than one or more mandated parameter values specified by the communication protocol. The training controller is configured to control the PHY circuitry, during the link establishment procedure, to use the one or more new parameter values instead of using the one or more mandated parameter values specified by the communication protocol. In some embodiments, the one or more new parameters values are relaxed as compared to the one or more mandated parameter values specified by the communication protocol, and using the one or more new parameters values improves interoperability with the second communication device.

In another embodiment, a link establishment method is for use in a communication network operating according to a communication protocol that defines a link establishment procedure that includes i) a negotiating procedure and ii) a training procedure, wherein the communication protocol specifies mandated parameter values that are to be used for the link establishment procedure. The method includes: performing, by the first communication device, the link establishment procedure, including: during the negotiating procedure, communicating, by the first communication device, with a second communication device via the communication link to negotiate one or more new parameter values for the link establishment procedure that are different than one or more mandated parameter values specified by the communication protocol; and during the link establishment procedure, using, by the first communication device, the one or more new parameter values instead of using the one or more mandated parameter values specified by the communication protocol. In some embodiments, the one or more new parameters values are relaxed as compared to the one or more mandated parameter values specified by the communication protocol, and using the one or more new parameters values improves interoperability with the second communication device.

BRIEF DESCRIPTION OF THE DRAWINGS

FIG. 3 is a flow diagram of an example link establishment method used by the communication devices of the communication network of FIG. 1, according to an embodiment.

DETAILED DESCRIPTION

Figure 1:
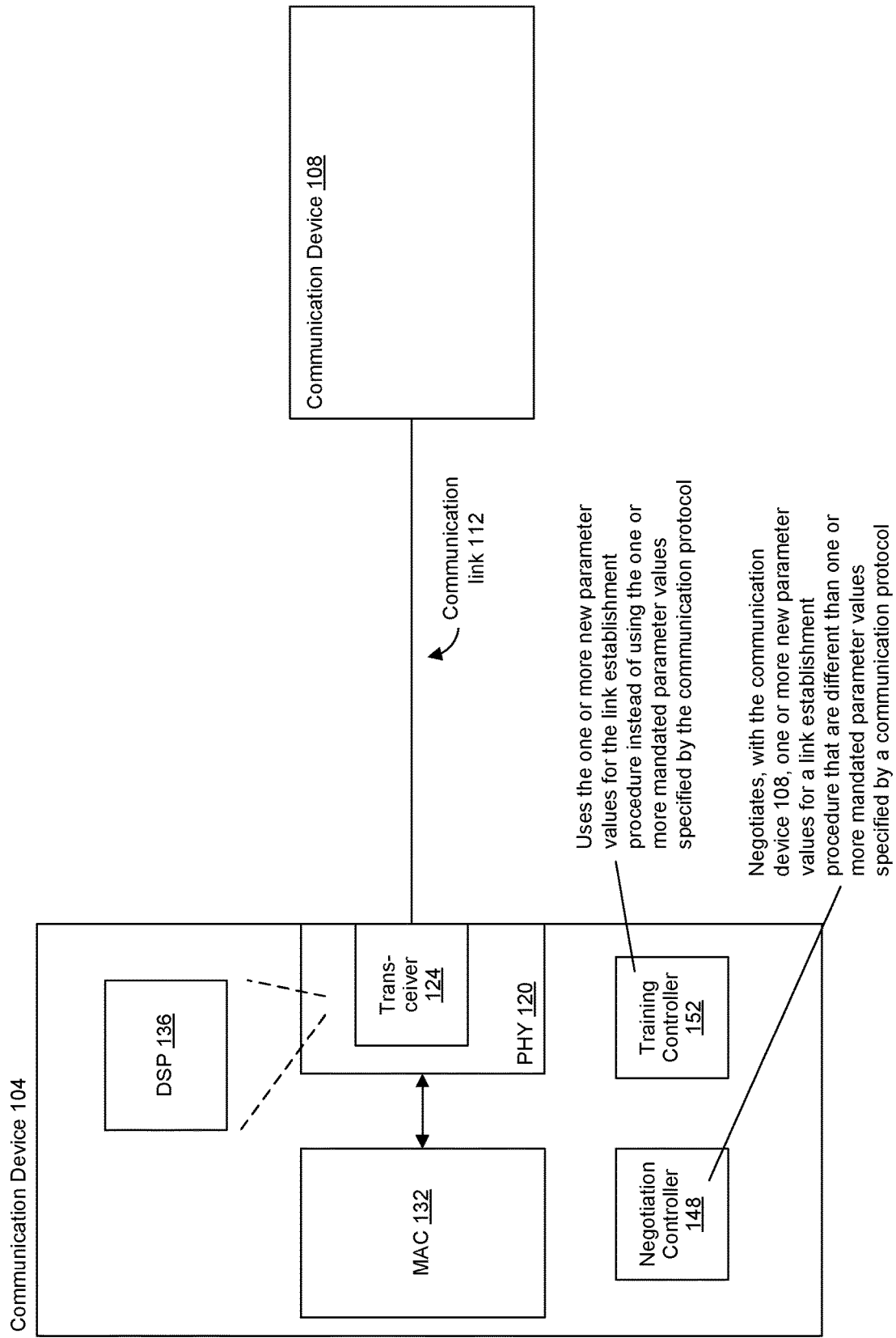
FIG. 1 is a simplified diagram of an example communication system in which communication devices negotiate new parameters corresponding to a link establishment procedure defined by a communication protocol, the new parameters being different than parameters mandated by the communication protocol, according to an embodiment.

The auto-negotiation and link training (ANLT) procedure defined by the Institute for Electrical and Electronics Engineers (IEEE) 802.3 Standard is an automated process for optimizing settings of components of link partners. In connection with ANLT procedure, the IEEE 802.3 Standard specifies various timeout values that, for example, mandate certain actions, events, etc., must be completed or occur within certain time periods. If the certain actions, events, etc., are not completed/do not occur within the specified time periods, one or both of the link partners must reset and restart the ANLT procedure from the beginning.

Some communication devices that are currently commercially available fail to comply with the required timeout values defined by the IEEE 802.3 Standard at least in some scenarios for reasons such as: design limitations, challenging operating conditions, as a compromise to optimize other performance metrics such as power consumption, etc.

Additionally, some commercially available communication devices impose stringent timeout requirements, not required by the IEEE 802.3 Standard, for procedures that occur after the ANLT process completes, such as a time for a physical coding sublayer (PCS) to obtain lock, a time for a media access control (MAC) layer to determine that a link is up, etc.

Further, a default transmit amplitude of one link partner may be too strong or too weak for given operating conditions (e.g., a level of channel loss, a noise level, levels of reflection signals, etc.), making it difficult for a far end link partner to optimally recover data. The impacted link partner therefore triggers a restart of the ANLT.

As a result, there are significant interoperation challenges between network devices made by different manufacturers that can lead to devices at both ends of a link repeatedly resetting/restarting because of IEEE 802.3-mandated parameters not being met. Additionally, amending the IEEE 802.3 Standard to modify the parameters would itself lead to interoperability problems with legacy communication devices that are configured to adhere to the original parameters and/or unnecessarily prolong the LT in some situations.

In embodiments described below, negotiation mechanisms permit communication devices to negotiate new parameters (e.g., timeout values, etc.), corresponding to a link establishment procedure, that are different than parameters mandated by a communication protocol. In at least some embodiments corresponding to the IEEE 802.3 Standard communication protocol, communication devices negotiate the new parameters during an auto-negotiation (AN) procedure of an auto-negotiation and link training (ANLT) procedure defined by the IEEE 802.3 Standard. This permits the communication devices to use, during the ANLT procedure, or during following operation, for example, new parameters (e.g., relaxed timeout values, a different default transmit amplitude, etc.) different than the parameters defined by the IEEE 802.3 Standard. With such a negotiation mechanism, network devices that cannot comply with the required parameter values defined by the IEEE 802.3 Standard can negotiate new parameters and thus avoid devices repeatedly resetting/restarting because of IEEE 802.3-mandated parameters not being met or being inadequate for operating conditions, as described above, according to some embodiments. Moreover, with such a negotiation mechanism changes to the IEEE 802.3 Standard are not required, according to some embodiments.

FIG. 1 is a simplified diagram of an example communication system 100, according to an embodiment. The communication system 100 includes a communication device 104 communicatively coupled to a communication device 108 via a communication link 112. In an embodiment, the communication link 112 comprises a suitable communication medium such as one or more twisted copper wire pairs, one or more coaxial cables, an optical cable, a wireless communication link, etc.

The communication device 104 comprises physical layer (PHY) circuitry 120 that is configured to perform PHY actions corresponding to a PHY entity defined by a communication protocol, such as the IEEE 802.3 Standard. The PHY circuitry 120 includes a transceiver 124 that is configured to transmit and receiver via the communication link 112.

The communication device 104 also comprises media access control (MAC) layer circuitry 132 that is configured to perform MAC layer actions corresponding to a MAC entity defined by the communication protocol (e.g., the IEEE 802.3 Standard). The MAC layer circuitry 132 is coupled to the PHY circuitry 120 and is configured to send packets to the PHY circuitry 120 for transmission via the communication link 112. The PHY circuitry 120 then transmits the packets via the communication link 112. Additionally, the PHY circuitry 120 is configured to receive packets via the communication link 116, and to provide the packets to the MAC layer circuitry 132. In an embodiment, the MAC layer circuitry 132 is coupled to the PHY circuitry 120 via a suitable media independent interface. In other embodiments, the MAC layer circuitry 132 is coupled to the PHY circuitry 120 via another suitable interface.

In some embodiments, the MAC layer circuitry 132 is coupled to a host processor (not shown) of the communication device 104. In some such embodiments, the MAC layer circuitry 132 receives packets from the host processor and sends the packets to the PHY circuitry 120 for transmission via the communication link 112; and the MAC layer circuitry 132 receives packets from the PHY circuitry 120, and provides the packets to the host processor, the packets having been received by the PHY circuitry 120 via the communication link 116.

In some embodiments in which the communication device 104 corresponds to a network switch that is coupled to multiple communication links (not shown) like the communication link 112, the communication device 104 includes a packet processor (not shown) that is configured to process header information in packets received via the communication links to determine communication links via which the packets are to be forwarded. In some such embodiments, the packet processor includes a forwarding database (not shown) that stores forwarding information comprising associations between network addresses and ports of the communication device 104 (where the ports correspond to respective communication links). The packet processor uses i) network address information in a header of a received packet (e.g., destination address information, virtual local area network (VLAN) information, etc.), and ii) forwarding information in the forwarding database that corresponds to the network address information in the received packet, to determine one or more ports via which the packet is to be transmitted.

Figure 2:
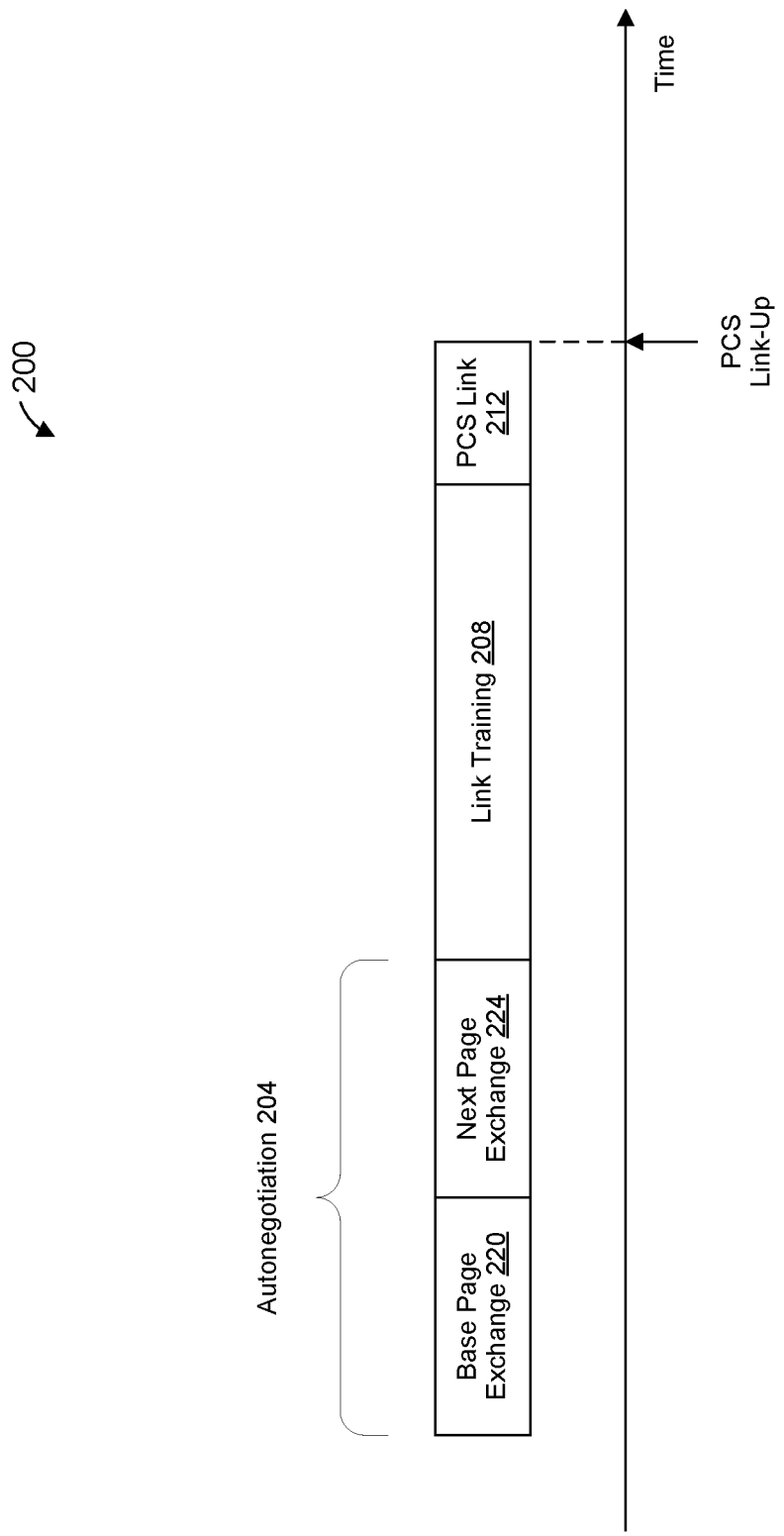
FIG. 2 is a simplified timing diagram of a link establishment procedure used by the communication devices of the communication network of FIG. 1, according to an embodiment.

The communication device 104 and the communication device 108 are configured to establish a PHY link between the communication device 104 and the communication device 108 by performing a link establishment procedure defined by a communication protocol, such as the IEEE 802.3 Standard. FIG. 2 is a simplified timing diagram of a link establishment procedure 200 corresponding to the IEEE 802.3 Standard, according to an embodiment. The link establishment procedure 200 comprises an autonegotiation (AN) procedure 204, a link training (LT) procedure 208, and a physical coding sublayer (PCS) link period 212. The AN procedure 204 and the LT procedure 208 are sometimes referred to collectively as the "ANLT" procedure.

During the AN procedure 204, the communication device 104 and the communication device 108 exchange information regarding the capability of each communication device with respect to communication parameters such as transmission speed, half-duplex vs. full-duplex communication capability, flow control capability, etc. Also during the AN procedure 204, the communication device 104 and the communication device 108 select the highest performance communication parameters that are supported by both communication devices.

The AN procedure 204 includes a first phase (sometimes referred to as the "base page exchange") 220 and a second phase (sometimes referred to as the "next page exchange") 224. During the base page exchange 220, the communication device 104 and the communication device 108 i) exchange information regarding the capability of each communication device with respect to certain communication parameters such as transmission speed, half-duplex vs. full-duplex communication capability, flow control capability, etc., and ii) select the highest performance communication parameters. For instance, as part of the AN procedure 204, the communication device 104 and the communication device 108 i) exchange information regarding a capability of each communication device with respect to transmission speed, and ii) select the highest performance transmission speed (which is sometimes referred to as "highest common denominator" or "HCD"). As an illustrative example, if the communication device 104 and the communication device 108 are both capable of operating according to i) 4×25 G=100 G Ethernet, and ii) 4×50 G=200 G Ethernet, the communication device 104 and the communication device 108 will select 4×50 G=200 G Ethernet for communications via the communication link.

During the next page exchange 224, the communication device 104 and the communication device 108 i) optionally exchange other information (e.g., regarding other capabilities of each communication device), and ii) optionally select other communication parameters. The IEEE 803.3 Standard does not specifically define the contents of the next page exchange 224, and thus the next page exchange 224 can be used for vendor-proprietary exchanges of information.

The communication device 104 comprises a negotiation controller 148 that is configured to control the PHY circuitry 120 to perform the AN procedure 204 specified by the communication protocol. For example, the negotiation controller 148 prompts the PHY circuitry 120 to transmit capability information via the communication link 112 as specified by the communication protocol. Additionally, the negotiation controller 148 analyzes capability information received from the communication device 108, and chooses communication parameters that are supported by both of the communication device 104 and the communication device 108. Additionally, the negotiation controller 148 configures the PHY circuitry 120 to use the chosen communication parameters, according to some embodiments.

In an embodiment, the communication protocol defines a maximum time duration (sometimes referred to as a "timeout") between a time when the HCD is chosen and an end of the AN procedure 204. If the AN procedure 204 is not completed within the timeout duration, the communication protocol specifies that the AN procedure 204 has failed.

The negotiation controller 148 includes a first timer that is configured to measure the timeout duration, and the negotiation controller 148 uses the first timer to determine whether the AN procedure 204 has completed prior to the first timer expiring, in some embodiments. When the training controller 152 determines that the AN procedure 204 is not completed when the first timer expires, the negotiation controller 148 determines that the AN procedure 204 failed.

Some commercially available communication devices may not be able to complete the AN procedure 204 within the specified timeout duration due to one or more factors such as design limitations of the communication device, challenging operating conditions (e.g., noise, interference, etc.), as a compromise to optimize other performance metrics such as power consumption, etc.

In an embodiment, the communication protocol defines a PHY state during the AN procedure 204 in which the PHY circuitry 120 determines whether a PHY link is operational. In particular, the PHY circuitry 120 waits for a maximum time duration (timeout) for the PHY link to become operational after choosing the HCD. If the PHY link does not become operational within the timeout duration, the communication protocol specifies that the AN procedure 204 has failed.

The negotiation controller 148 includes a second timer that is configured to measure the timeout duration, and the negotiation controller 148 uses the second timer to determine whether the PHY link has become operational prior to the second timer expiring, in some embodiments. When the training controller 152 determines that the PHY link is not operational when the second timer expires, the negotiation controller 148 determines that the AN procedure 204 failed.

Some commercially available communication devices may not be able to confirm that the PHY link is operational within the specified timeout duration due to one or more factors such as design limitations of the communication device, challenging operating conditions (e.g., noise, interference, etc.), as a compromise to optimize other performance metrics such as power consumption, etc.

The LT procedure 208 includes the communication device 104 and the communication device 108 exchanging training signals via the communication link 112 and using the training signals to adapt signal processing parameters used by signal processing circuitry of the communication device 104 and the communication device 108. Examples of signal processing circuitry and signal processing parameters used by the signal processing circuitry are described below.

When the LT procedure 208 is successfully completed, a PCS function implemented by the PHY circuitry 120 attempts to synchronize with a PCS function implemented by the communication device 108. When the PCS functions are synchronized, the communication link 112 is in a PCS link-up state and the PCS circuitry 120 is ready for normal data exchange with the communication device 108 via the communication link 112, according to an embodiment.

The PHY circuitry 120 is configured to perform various signal processing actions regarding signals transmitted and signals received via the communication link 112. Examples of signal processing actions performed by the PHY circuitry 120 includes one or more of: adaptive equalization, an echo cancellation, near-end crosstalk (NEXT) cancellation, far-end crosstalk (FEXT) cancellation, interference cancellation, beamforming, etc.

In some embodiments, the various signal processing actions, such as various processing actions related to adaptation, cancellation, etc. are performed by the communication device 104 (e.g., PHY circuitry 120) based on training signals received via the communication link 112 from the communication device 108. For example, as described in more detail below, in some embodiments, the PHY circuitry 120 is configured to process training signals received from the communication device 108 to adapt or otherwise adjust various parameters of the transceiver 124 based on the received training signals. Additionally or alternatively, in some embodiments, the communication device 104 (e.g., PHY circuitry 120) is configured to request the communication device 108 to adapt or otherwise adjust parameters of components, such as transmit equalizer (e.g., FFE) and/or other parameters (e.g., digital signal processing (DSP) processing parameters), used at the communication device 108 for transmission to the communication device 104 to improve quality of received signals at the communication device 104. For example, the communication device 104 is configured to embed one or more messages into training signals that the communication device 104 transmits during link training to the communication device 108, where the one or more messages include one or more requests for the communication device 104 to adjust parameters, such as transit equalizer (e.g., FFE) tap values, at the communication device 104 to improve quality of reception of signals transmitted from the communication device 104 to the communication device 108. In an embodiment, the communication device 104 is configured to request adjustment of parameters at the communication device 108 in accordance with a link training protocol, e.g., as specified by the IEEE 803.2 standard.

In some embodiments, adaptive equalization performed at the communication device 104 involves processing a received signal that was received from the communication device 108 via the communication link 112 to counteract frequency attenuation and/or phase delay caused by a communication channel between the communication device 104 and the communication device 108, according to an embodiment. In some embodiments, performing adaptive equalization comprises using one or both of i) a feed forward equalizer (FFE), and ii) a decision feedback equalizer (DFE). In other embodiments, performing adaptive equalization additionally or alternatively comprises using one or more other suitable equalizers different than an FFE and a DFE. In some embodiments in which the adaptive equalization comprises using an FFE, the FFE comprises analog equalizer circuitry that processes a received signal (an "analog received signal") prior to digitization of the received signal by an analog-to-digital converter (ADC), which is not shown in FIG. 1. In other embodiments in which adaptive equalization comprises using an FFE, the FFE comprises digital equalizer circuitry that processes the received signal (a "digital received signal") after digitization by the ADC (not shown).

In some embodiments, echo cancellation performed at the communication device 104 comprises processing the received signal to reduce received echoes of a transmit signal transmitted by the communication device 104 to the communication device 108 via the communication link 112. For example, when the communication device 104 transmits via the communication link, echoes may be received by the communication device 104 as a result of impedance discontinuities in the path from the communication device 104 to the communication device 108, such as due to a connection between an integrated circuit (IC) chip and a printed circuit board (PCB) corresponding to the communication device 104, a connection between the PCB and a cable, cable connectors coupled to a cable of the communication link 112, damage to cables, imperfections in cables, etc. Performing echo cancellation involves generating a recreated echo signal using the transmit signal, and subtracting the recreated echo signal from the received signal, according to an embodiment.

In some embodiments, the communication device 104 is configured to, additionally or alternatively, perform other processing operations, such as processing operations related to transmission of signals over twisted pair cables.

As just an example, in embodiments in which the communication link 112 comprises multiple twisted pairs, NEXT cancellation involves processing each signal received via a respective twisted pair to reduce NEXT caused by signal(s) transmitted by the communication device 104 via other twisted wire pair(s) 116. NEXT cancellation includes generating, for each signal received via a respective twisted pair, a recreated NEXT signal using the signals transmitted by the communication device 104 in the other twisted wire pair(s), and subtracting the recreated NEXT signal from the received signal from the respective twisted pair.

As another example, in embodiments in which the communication link 112 comprises multiple twisted pairs, FEXT cancellation involves processing each signal received via a respective twisted pair to reduce FEXT caused by signal(s) transmitted by the communication device 108 in other twisted wire pair(s). FEXT cancellation includes generating, for each signal received via a respective twisted pair, a recreated FEXT signal using the signals received in the other twisted wire pair(s), and subtracting the recreated FEXT signal from the received signal in the respective twisted pair.

According to some embodiments, a FEXT canceller (not shown) of the PHY circuitry 120 comprises a plurality of taps that correspond to different sets of two twisted pairs. In some embodiments, each tap comprises a respective multiplier configured to multiply a respective receive signal in a respective twisted pair with a respective FEXT cancellation coefficient to generate a respective weighted receive signal. For each twisted pair, a summer adds the weighted receive signals together to generate the recreated FEXT signal, and the recreated FEXT signal is subtracted from the received signal in the twisted pair. As will be described further below, the FEXT cancellation coefficients are adapted during the LT procedure 208.

In some embodiments, an echo canceller (not shown) and a NEXT canceller (not shown) are combined in a unitary echo/NEXT canceller that is configured to process the received signal to reduce both echoes and NEXT described above. In such embodiments, parameters used by the unitary echo/NEXT canceller are adapted during the LT procedure 208 in which the communication device 104 transmits known training signals.

The PHY circuitry 120 comprises a digital signal processor (DSP) 136 that is configured to perform signal processing acts such as described above, e.g., one or more of adaptive equalization, echo cancellation, NEXT cancellation, FEXT cancellation, etc.

The communication device 108 has a structure the same as or similar to the communication device 104, in an embodiment. For example, the communication device 108 performs signal processing actions such as described above.

As discussed above, the signal processing components of the PHY circuitry 120 use signal processing parameters, such as coefficients, programmable delays, etc., to process signals received via the communication link 112, and such signal processing parameters are adapted during the LT procedure 208. The LT procedure 208 is specified by a communication protocol, such at the IEEE 802.3 Standard, according to some embodiments.

The LT procedure 208 includes the communication device 104 and the communication device 108 exchanging training signals via the communication link 112 and using the training signals to adapt signal processing parameters used by signal processing circuitry of the communication device 104 and the communication device 108, such as coefficients, programmable delays, etc. For example, when the communication device 104 transmits training signals to the communication device 108, the DSP 136 analyzes signals received via the communication link 112 to adapt NEXT cancellation parameters, echo cancellation parameters, etc., according to some embodiments. Also, when the communication device 104 transmits training signals to the communication device 108, a DSP of the communication device 108 (not shown) analyzes signals received via the communication link 112 to adapt equalizer coefficients and/or FEXT cancellation parameters, according to some embodiments. Similarly, when the communication device 108 transmits training signals to the communication device 104, a DSP of the communication device 108 (not shown) analyzes signals received via the communication link 112 to adapt NEXT cancellation parameters, echo cancellation parameters, etc., according to some embodiments. Also, when the communication device 108 transmits training signals to the communication device 104, the DSP 136 analyzes signals received via the communication link 112 to adapt equalizer coefficients and/or FEXT cancellation parameters, according to some embodiments.

The communication device 104 comprises a training controller 152 that is configured to control the PHY circuitry 120 to perform the LT procedure 208 specified by the communication protocol. For example, the training controller 152 prompts the PHY circuitry 120 to transmit training signals via the communication link 112 as specified by the communication protocol. Additionally, the training controller 152 prompts the DSP 136 to adapt signal processing parameters based on the training signals transmitted by the PHY circuitry 120 via the communication link 112, according to some embodiments. Further, the training controller 152 prompts the DSP 136 to adapt signal processing parameters based on training signals that were transmitted by the communication device 108 via the communication link 112 and received by the PHY circuitry 120, according to some embodiments.

Additionally, the training controller 152 is configured to determine when the LT procedure 208 is complete. For example, the LT procedure 208 is determined to be complete when both i) signal processing components of the PHY circuitry 120 are adequately trained and thus ready to commence normal data transmission (sometimes referred to herein as "the local receiver is ready"), and ii) signal processing components of the communication device 108 are adequately trained and thus ready to commence normal data transmission (sometimes referred to herein as "the remote receiver is ready"). In response to the training controller 152 determining that the local receiver is ready, the training controller 152 prompts the PHY circuitry 120 to transmit to the communication device 108, via the communication link 112, an indication that the local receiver is ready. Similarly, when the communication device 108 determines that the remote receiver is ready, the communication device 108 transmits to the communication device 104, via the communication link 112, an indication that the remote receiver is ready.

In an embodiment, the training controller 152 determines that the local receiver is ready based on a state of adaptation of the signal processing components. For example, the training controller 152 and/or the DSP 136 determine when signal processing parameters have converged to stable values during the LT procedure 208, and the training controller 152 determines when the local receiver is ready based on whether the signal processing parameters have converged to stable values.

Additionally or alternatively, the DSP 136 (and/or other circuitry of the PHY circuitry 120, the MAC layer circuitry 132, etc.) is configured to measure one or more signal quality metrics (e.g., a signal to noise ratio (SNR), a bit error rate, etc.) based on training signals received from the communication device, and the DSP 136 and/or the training controller 152 are configured to use the one or more signal quality metrics to determine whether the local receiver is ready.

In some embodiments, the training signals are organized as training frames, and the DSP 136 (and/or other circuitry of the PHY circuitry 120, etc.) is configured to synchronize with the training frames (referred to as "frame lock" in the IEEE 802.3 Standard) received from the communication device 108. In some such embodiments, the DSP 136 and/or the training controller 152 are configured to determine when the LT procedure 208 is complete additionally based on whether the DSP 136 (and/or other circuitry of the PHY circuitry 120, etc.) is frame locked. For example, the DSP 136 (and/or other circuitry of the PHY circuitry 120, etc.) being frame locked is a requirement for determining that the local receiver is ready, in some embodiments. Similarly, a DSP and/or other circuitry of the communication device 108 being frame locked is a requirement for the communication device 108 determining that the remote receiver is ready, in some embodiments.

In an embodiment, the communication protocol defines a maximum time duration (timeout) between a start of the LT procedure 208 and when the communication link 112 is in the PCS link-up state. If the communication link 112 is not in the PCS link-up state within the timeout duration, the communication protocol specifies that the LT procedure 208 has failed.

The training controller 152 includes a first timer that is configured to measure the timeout duration, and the training controller 152 uses the first timer to determine whether the communication link 112 is in the PCS link-up state prior to the first timer expiring, in some embodiments. When the training controller 152 determines that the PCS circuitry 120 is not in the PCS link-up state when the first timer expires, the training controller 152 determines that the LT procedure 208 failed.

In another embodiment, the communication protocol defines a timeout duration between a start of the LT procedure 208 and an end of the LT procedure 208. If the LT procedure 208 is not completed within the timeout duration, the communication protocol specifies that the LT procedure 208 has failed. In some such embodiments, the training controller 152 determines whether the LT procedure 208 is completed prior to the first timer expiring. When the training controller 152 determines that the LT procedure 208 is not completed when the first timer expires, the training controller 152 determines that the LT procedure 208 failed.

Some commercially available communication devices may not be able to complete the LT procedure 208 or achieve the PCS link-up state within the specified timeout duration due to one or more factors such as design limitations of the communication device, challenging operating conditions (e.g., noise, interference, etc.), as a compromise to optimize other performance metrics such as power consumption, etc.

In another embodiment, the communication device 104 and/or the communication device 104 measure a time duration (timeout) between when the LT procedure 208 has completed and when the communication link 112 is in the PCS link-up state. If the communication link 112 is not in the PCS link-up state within the timeout duration, the communication device determines that the ANLT procedure should be restarted.

In such embodiments, the training controller 152 includes a second timer that is configured to measure the timeout duration between when the LT procedure 208 has completed and when the communication link 112 is in the PCS link-up state, and the training controller 152 uses the second timer to determine whether the communication link 112 is in the PCS link-up state prior to the second timer expiring, in some embodiments. When the training controller 152 determines that the PCS circuitry 120 is not in the PCS link-up state when the second timer expires, the training controller 152 determines that the ANLT procedure should be restarted.

Some commercially available communication devices may not be able to achieve the PCS link-up state within the specified timeout duration due to one or more factors such as design limitations of the communication device, challenging operating conditions (e.g., noise, interference, etc.), as a compromise to optimize other performance metrics such as power consumption, etc.

Once the PCS circuitry 120 is in the PCS link-up state, the MAC layer circuitry 132 communicates with MAC layer circuitry of the communication device 108 to initialize communications between the MAC layer circuitry and the MAC layer circuitry of the communication device 108. When the MAC layer circuitry 132 and the MAC layer circuitry of the communication device 108 are successfully initialized, the MAC layer circuitry 132 transitions to a MAC link-up state and the MAC layer circuitry 121320 is ready for normal data exchange with the communication device 108 via the communication link 112, according to an embodiment.

In another embodiment, the communication device 104 and/or the communication device 104 measure a time duration (timeout) between when PCS circuitry 120 transitions to the PCS link-up state and when the communication link 112 is in the MAC link-up state. If the communication link 112 is not in the MAC link-up state within the timeout duration, the communication device determines that the ANLT procedure should be restarted.

In such embodiments, the training controller 152 includes a third timer that is configured to measure the timeout duration between when the PHY circuitry 120 transitions to the PCS link-up state and when the MAC layer circuitry 132 transitions to a MAC link-up state, and the training controller 152 uses the third timer to determine whether the MAC layer circuitry 132 is in the MAC link-up state prior to the third timer expiring, in some embodiments. When the training controller 152 determines that the MAC layer circuitry 132 is not in the MAC link-up state when the third timer expires, the training controller 152 determines that the ANLT procedure should be restarted.

Some commercially available communication devices may not be able to achieve the MAC link-up state within the specified timeout duration due to one or more factors such as design limitations of the communication device, challenging operating conditions (e.g., noise, interference, etc.), as a compromise to optimize other performance metrics such as power consumption, etc.

As discussed above with reference to FIG. 2, the next page exchange 224 permits communication devices to optionally exchange other information not specified by the communication protocol. In some embodiments, the communication device 104 and the communication device 108 negotiate, during the next page exchange 224 of the negotiation procedure 204, one or more new timeout values for the link establishment procedure that are different than one or more mandated timeout values specified by the communication protocol. Then, the communication devices use the one or more new timeout values for the link establishment procedure instead of using the one or more mandated parameter values specified by the communication protocol.

The IEEE 802.3 Standard defines two types of information elements that are exchanged during the next page exchange 224: a "message next page" and an "unformatted next page". A message next page includes a unique identifier (e.g., an organizationally unique identifier (OUI) or another suitable identifier) that is registered with and/or allocated by the IEEE, and which indicates an organization to which the message next page corresponds and/or a purpose of the message next page. The message next page also includes a data field having a length of 32 bits (or another suitable length). The unique identifier in the message next page indicates a format of the data field, in an embodiment.

The unformatted next page includes a data field having a length of 43 bits (or another suitable length). The unformatted next page is associated with a message next page and is transmitted after the message next page. A format of the unformatted next page that is associated with and follows a message next page is indicated by the unique identifier in the message next page.

In some embodiments, the communication device 104 and the communication device 108 negotiate a new timeout value by exchanging timeout information using next page information elements such as described above. For example, the communication device 104 transmits a first message next page having a unique identifier that indicates a negotiation of parameters (e.g., timeout values, etc.) corresponding to a link establishment procedure; then the communication device 104 transmits a corresponding first unformatted next page having timeout capability information, according to an embodiment. Similarly, the communication device 104 receives, from the communication device 108, a second message next page having the unique identifier; then the communication device 104 receives, from the communication device 108, a corresponding second unformatted next page having timeout capability information, according to an embodiment. Then, the communication devices 104, 108 both select a new timeout value that both the communication devices 104, 108 support using a selection rule that is known to both the communication devices 104, 108, according to an embodiment. As an illustrative example, the communication devices 104, 108 select a highest timeout value that both the communication devices 104, 108 support.

In an embodiment, each of the communication devices 104, 108 transmits to the other communication device 104, 108 i) a maximum timeout value that the communication device can support, and ii) a suggested timeout value; and the communication devices 104, 108 select the highest suggested timeout value that is supported by both communication devices 104, 108. In another embodiment, each of the communication devices 104, 108 transmits to the other communication device 104, 108 a maximum timeout value that the communication device can support; and the communication devices 104, 108 select the highest timeout value that is supported by both communication devices 104, 108.

In another embodiment, each of the communication devices 104, 108 transmits to the other communication device 104, 108 i) a lowest timeout value that the communication device can support, and ii) a suggested timeout value; and the communication devices 104, 108 select the lowest suggested timeout value that is supported by both communication devices 104, 108. In another embodiment, each of the communication devices 104, 108 transmits to the other communication device 104, 108 a lowest timeout value that the communication device can support; and the communication devices 104, 108 select the lowest timeout value that is supported by both communication devices 104, 108.

Table 1 is an example format of an unformatted next page that includes timeout capability information for multiple timeout values discussed above, according to an embodiment.

TABLE 1

| Timeout Period | Bits of Data Field of Unformatted Next Page (U43:U0) |
|---|---|
| HCD chosen->AN procedure completed | U7:U0 |
| Start of the LT procedure->PCS link-up | U15:U8 |
| LT procedure completed->PCS link-up | U23:U16 |
| PCS link-up->MAC link-up | U31:U24 |
| HCD chosen->PHY link operational | U39:U32 |

In the example format of Table 1, each timeout corresponds to a respective set of eight consecutive bits of the data field of the unformatted next page. Table 2 is an example encoding of the eight bits corresponding to each timeout, according to an embodiment.

TABLE 2

| Encoding | Upper Four Bits Maximum Value | Lower Four Bits Proposed Value |
|---|---|---|
| 0000 | No Limit-can accept any proposal | No Flexibility-use value defined by communication protocol |
| 0001 | 1x | 1x |
| 0010 | 2x | 2x |
| 0011 | 4x | 4x |
| 0100 | 8x | 8x |
| 0101 | 16x | 16x |
| 0110 | 32x | 32x |
| 0111 | 64x | 64x |
| 1000-1111 | Reserved | Reserved |

Regarding the set of eight consecutive bits corresponding to each timeout, the upper four bits indicate an upper limit (maximum value) of the timeout duration, and the lower four bits indicate proposed value for the timeout duration, according to an embodiment. The symbol "1x" indicates a predetermined value multiplied by one; the symbol "2x" indicates the predetermined value multiplied by two; "4x" indicates the predetermined value multiplied by four, and so on. The predetermined value is known ahead of time by the communication devices 104, 108. In some embodiments, the predetermined value is the corresponding timeout value defined by the communication protocol.

The example formats/encodings of Tables 1 and 2 are merely illustrative, and other suitable formats/encodings are used in other embodiments.

The IEEE 802.3 Standard defines some initial PHY conditions of a transmitter for starting the LT procedure 208. In some circumstances (e.g., some operating conditions), however, it may be advantageous for a transmitter to use different initial condition when starting the LT procedure 208. As an illustrative example, a default transmit amplitude of one of the communication devices 104, 108 may be too strong or too weak for given operating condition (e.g., channel loss, reflections, etc.), making it difficult for other communication device 104, 108 to optimally recover data being transmitted. This may result in the impacted communication device 104, 108 restarting the ANLT procedure.

As another example, default setting of a finite impulse response (FIR) filter of one of the communication devices 104, 108 may be poorly suited for an operating condition, making it difficult for other communication device 104, 108 to optimally recover data being transmitted. This may result in the impacted communication device 104, 108 restarting the ANLT procedure.

In some embodiments, the communication device 104 and the communication device 108 negotiate one or more PHY parameter values (e.g., a default transmit amplitude, default transmit FIR coefficients, etc.) by communicating information using next page information elements such as described above. For example, the communication device 104 transmits a message next page having i) a unique identifier that indicates a negotiation of PHY parameters (e.g., PHY parameters, etc.), and ii) PHY parameter information in the data field of the message next page, according to an embodiment. Then, the communication device 108 uses the PHY parameter information to select one or more initial PHY parameter values for communicating with the communication device 104, according to an embodiment. As an illustrative example, the communication device 108 uses best efforts to apply one or more of the PHY parameter values indicated by the message next page. For example, if the communication device 108 is unable to set the PHY parameter exactly as specified in the message next page, the communication device 108 approximates the specified PHY parameter using best efforts, according to an embodiment.

Table 3 is an example format of a data field of a message next page that includes PHY parameter information, according to an embodiment.

TABLE 3

| PHY Parameter | Bits | Encoding | |
|---|---|---|---|
| Transmit Amplitude | U3:U0 | 0000 | Use Default |
| | | 0001 | 1.0x |
| | | 0010 | 1.5x |
| | | 0011 | 0.5x |
| | | others | reserved |
| Tx FIR p % | U11:U8 | 0000 | Use Default |
| | | 0001 | 0% |
| | | 0010 | 25% |
| | | 0011 | 50% |
| | | 0100 | 100% |
| | | others | reserved |
| Tx FIR q % | U15:U12 | 0000 | Use Default |
| | | 0001 | 0% |
| | | 0010 | 25% |
| | | 0011 | 50% |
| | | 0100 | 100% |
| | | others | reserved |
| Tx FIR r % | U19:U16 | 0000 | Use Default |
| | | 0001 | 0% |
| | | 0010 | 25% |
| | | 0011 | 50% |
| | | 0100 | 100% |
| | | others | reserved |

Regarding the transmit amplitude, the symbol "1x" indicates a predetermined (default) value multiplied by one; the symbol "2x" indicates the default value multiplied by two; "4x" indicates the default value multiplied by four, and so on. The default value is known ahead of time by the communication devices 104, 108. In some embodiments, the default value is defined by the communication protocol.

Regarding the transmit FIR filter, the symbols p, q, and r indicate three taps of the transmit FIR filter, and the encodings specify, for each tap, one of i) a default values, ii) 25% of a maximum value, iii) 50% of the maximum value, and iv) 100% of the maximum value. In an embodiment, the settings of all three taps in the data field of the message next page must sum to 100%.

The example formats/encodings of Table 3 are merely illustrative, and other suitable formats/encodings are used in other embodiments.

In other embodiments, the communication device 104 and the communication device 108 additionally or alternatively negotiate one or more other suitable PHY parameter values (e.g., different than the default transmit amplitude and default transmit FIR coefficients discussed above) by communicating information using next page information elements in a similar manner.

FIG. 3 is a flow diagram of an example link establishment method 300, according to an embodiment. The method 300 is implemented by the communication device 104 of FIG. 1, in an embodiment, and FIG. 3 is described with reference to FIG. 1 for explanatory purposes. In other embodiments, the method 300 is implemented using another suitable communication device different than the communication device 104 of FIG. 1. Also, the communication device 104 implements another suitable method for establishing a communication link different than the method 300.

In the method 300, the first communication device and the second communication device operate according to a communication protocol defines a link establishment procedure that includes i) a negotiating procedure and ii) a training procedure, and the communication protocol specifies mandated parameter values that are to be used for the link establishment procedure. In an embodiment, the communication protocol corresponds to the IEEE 802.3 Standard, the negotiation procedure is the AN procedure 204 discussed above, and the training procedure is the LT procedure 208 discussed above. In other embodiments, the method 300 is implemented in the context of another communication protocol and/or using other suitable negotiation and/or training procedures different than AN procedure 204 discussed above, and the training procedure is the LT procedure 208. The method 300 is described with reference to FIG. 2 merely for explanatory purposes.

The method 300 includes the first communication device performing the link establishment procedure with the second communication device. For example, the communication device 104 performs the link establishment procedure with the communication device 108.

Performing the link establishment procedure includes the first communication device communicating (block 304), during the negotiation procedure, with the second communication device via a communication link to negotiate one or more new parameter values for the link establishment procedure that are different than one or more mandated parameter values specified by the communication protocol. For example, the communication device 104 communicates with the communication device 108 during the AN procedure 204, with the second communication device via a communication link to negotiate one or more new parameter values for the link establishment procedure that are different than one or more mandated parameter values specified by the communication protocol.

At block 308, during the link establishment procedure, the first communication device uses the one or more new parameter values instead of using the one or more mandated parameter values specified by the communication protocol.

In an embodiment, communicating with the second communication to negotiate the one or more new parameter values at block 304 comprises communicating with the second communication to negotiate a new timeout value that is longer than a mandated timeout value specified by the communication protocol, the mandated timeout value corresponding to a time duration by which an event of the link establishment procedure must occur; and using the one or more new parameter values at block 308 comprises using the new timeout value so that more time is allowed for the event of the link establishment procedure to occur as compared to the mandated timeout value specified by the communication protocol.

In an embodiment, communicating with the second communication to negotiate the new timeout value at block 304 comprises: transmitting, by the first communication device, first timeout capability information to the second communication device; receiving, at the first communication device, second timeout capability information from the second communication device; and selecting, at the first communication device, the new timeout value using the second timeout capability information.

In an embodiment, transmitting the first timeout capability information to the second communication device comprises transmitting a first maximum timeout value to the second communication device; receiving second timeout capability information from the second communication device comprises receiving a second maximum timeout value from the second communication device; and selecting the new timeout value comprises using the second maximum timeout value to select the timeout value as being i) less than or equal to the first maximum timeout value, and ii) less than or equal to the second maximum timeout value.

In an embodiment, transmitting the first timeout capability information to the second communication device comprises transmitting to the second communication device i) a first maximum timeout value, and ii) a first proposed timeout value; receiving second timeout capability information from the second communication device comprises receiving from the second communication device i) a second maximum timeout value, and ii) a second proposed timeout value; and selecting the new timeout value comprises selecting the new timeout value as one of i) the first proposed timeout value, and ii) the second proposed timeout value, that is i) less than or equal to the first maximum timeout value, and ii) less than or equal to the second maximum timeout value.

Embodiment 1: A first communication device for use in a communication network operating according to a communication protocol, the communication protocol defining a link establishment procedure that includes i) a negotiating procedure and ii) a training procedure, wherein the communication protocol specifies mandated parameter values that are to be used for the link establishment procedure, the first communication device comprising: physical layer (PHY) circuitry having a transceiver that is configured to transmit and receive via a communication link; a negotiation controller configured to control the PHY circuitry to i) perform the negotiation procedure, and ii) during the negotiating procedure, control the PHY circuitry to communicate with a second communication device via the communication link to negotiate one or more new parameter values for the link establishment procedure that are different than one or more mandated parameter values specified by the communication protocol; and a training controller that is configured to control the PHY circuitry, during the link establishment procedure, to use the one or more new parameter values instead of using the one or more mandated parameter values specified by the communication protocol.

Embodiment 2: The first communication device of embodiment 1, wherein: the negotiation controller is configured to control the PHY circuitry to communicate with the second communication device to negotiate a new timeout value that is longer than a mandated timeout value specified by the communication protocol, the mandated timeout value corresponding to a time duration by which an event of the link establishment procedure must occur; and the training controller is configured to control the PHY circuitry to use the new timeout value so that more time is given for the event to occur as compared to the mandated timeout value specified by the communication protocol.

Embodiment 3: The first communication device of embodiment 2, wherein the negotiation controller is configured to: control the PHY circuitry to transmit first timeout capability information to the second communication device; receive second timeout capability information from the second communication device; and select the new timeout value using the second timeout capability information.

Embodiment 4: The first communication device of embodiment 3, wherein the negotiation controller is configured to: control the PHY circuitry to transmit, as an element of the first timeout capability information, a first maximum timeout value to the second communication device; receive, as an element of the second timeout capability information, a second maximum timeout value from the second communication device; and use the second maximum timeout value to select the new timeout value as being i) less than or equal to the first maximum timeout value, and ii) less than or equal to the second maximum timeout value.

Embodiment 5: The first communication device of embodiment 3, wherein the negotiation controller is configured to: control the PHY circuitry to transmit, as elements of the first timeout capability information, i) a first maximum timeout value, and ii) a first proposed timeout value; receive, as elements of the second timeout capability information, i) a second maximum timeout value, and ii) a second proposed timeout value; and select the new timeout value as one of i) the first proposed timeout value, and ii) the second proposed timeout value, that is i) less than or equal to the first maximum timeout value, and ii) less than or equal to the second maximum timeout value.

Embodiment 6: The first communication device of any of embodiments 2-5, wherein the negotiation controller is configured to: control the PHY circuitry to transmit the first timeout capability information within a next page exchange defined by the Institute for Electrical and Electronics Engineers (IEEE) 802.3 Standard; and receive the second timeout capability information during the next page exchange.

Embodiment 7: The first communication device of embodiment 6, wherein the negotiation controller is configured to: control the PHY circuitry to transmit the first timeout capability information in a first unformatted next page information element defined by the IEEE 802.3 Standard; and receive the second timeout capability information in a second unformatted next page information element defined by the IEEE 802.3 Standard.

Embodiment 8: The first communication device of embodiment 6, wherein the negotiation controller is configured to: control the PHY circuitry to transmit the first timeout capability information in a first message next page information element defined by the IEEE 802.3 Standard; and receive the second timeout capability information in a second message next page information element defined by the IEEE 802.3 Standard.

Embodiment 9: The first communication device of any of embodiments 1-8, wherein: the negotiation controller is configured to receive from the second communication device an indication of a new initial transmitter amplitude that is different than a mandated initial transmitter amplitude specified by the communication protocol, the initial transmitter amplitude; and the training controller is configured to set a transmitted amplitude of transceiver using the indication of the new initial transmitter amplitude for transmitting training signals during the training procedure.

Embodiment 10: The first communication device of any of embodiments 1-9, wherein: the negotiation controller is configured to receive from the second communication device indications of new initial transmitter finite impulse response (FIR) filter coefficients that are different than mandated initial transmitter FIR filter coefficients specified by the communication protocol, the initial transmitter amplitude; and the training controller is configured to set coefficients of a transmitter FIR filter of the transceiver using the indications of the new initial transmitter FIR filter coefficients for transmitting training signals during the training procedure.

Embodiment 11: A link establishment method in a communication network operating according to a communication protocol, the communication protocol defining a link establishment procedure that includes i) a negotiating procedure and ii) a training procedure, wherein the communication protocol specifies mandated parameter values that are to be used for the link establishment procedure, the method comprising: performing, by the first communication device, the link establishment procedure, including: during the negotiating procedure, communicating, by the first communication device, with a second communication device via the communication link to negotiate one or more new parameter values for the link establishment procedure that are different than one or more mandated parameter values specified by the communication protocol; and during the link establishment procedure, using, by the first communication device, the one or more new parameter values instead of using the one or more mandated parameter values specified by the communication protocol.

Embodiment 12: The link establishment method of embodiment 11, wherein: communicating with the second communication device to negotiate the one or more new parameter values comprises communicating with the second communication device to negotiate a new timeout value that is longer than a mandated timeout value specified by the communication protocol, the mandated timeout value corresponding to a time duration by which an event of the link establishment procedure must occur; and using the one or more new parameter values comprises using the new timeout value so that more time is allowed for the event of the link establishment procedure to occur as compared to the mandated timeout value specified by the communication protocol.

Embodiment 13: The link establishment method of embodiment 12, wherein communicating with the second communication device to negotiate the new timeout value comprises: transmitting, by the first communication device, first timeout capability information to the second communication device; receiving, at the first communication device, second timeout capability information from the second communication device; and selecting, at the first communication device, the new timeout value using the second timeout capability information.

Embodiment 14: The link establishment method of embodiment 13, wherein: transmitting the first timeout capability information to the second communication device comprises transmitting a first maximum timeout value to the second communication device; receiving second timeout capability information from the second communication device comprises receiving a second maximum timeout value from the second communication device; and selecting the new timeout value comprises using the second maximum timeout value to select the new timeout value as being i) less than or equal to the first maximum timeout value, and ii) less than or equal to the second maximum timeout value.

Embodiment 15: The link establishment method of embodiment 13, wherein: transmitting the first timeout capability information to the second communication device comprises transmitting to the second communication device i) a first maximum timeout value, and ii) a first proposed timeout value; receiving second timeout capability information from the second communication device comprises receiving i) a second maximum timeout value, and ii) a second proposed timeout value; and selecting the new timeout value comprises selecting the new timeout value as one of i) the first proposed timeout value, and ii) the second proposed timeout value, that is i) less than or equal to the first maximum timeout value, and ii) less than or equal to the second maximum timeout value.

Embodiment 16: The link establishment method of any of embodiments 12-15, wherein: transmitting the first timeout capability information to the second communication device comprises transmitting the first timeout capability information within a next page exchange defined by the Institute for Electrical and Electronics Engineers (IEEE) 802.3 Standard; and receiving the second timeout capability information from the second communication device comprises receiving the second timeout capability information during the next page exchange.

Embodiment 17: The link establishment method of embodiment 16, wherein: transmitting the first timeout capability information within the next page exchange comprises transmitting the first timeout capability information in a first unformatted next page information element defined by the IEEE 802.3 Standard; and receiving the second timeout capability information during the next page exchange comprises receiving the second timeout capability information in a second unformatted next page information element defined by the IEEE 802.3 Standard.

Embodiment 18: The link establishment method of embodiment 16, wherein: transmitting the first timeout capability information within the next page exchange comprises transmitting the first timeout capability information in a first message next page information element defined by the IEEE 802.3 Standard; and receiving the second timeout capability information during the next page exchange comprises receiving the second timeout capability information in a second message next page information element defined by the IEEE 802.3 Standard.

Embodiment 19: The link establishment method of any of embodiments 11-18, wherein: communicating with the second communication device to negotiate the one or more new parameter values comprises receiving from the second communication device an indication of a new initial transmitter amplitude that is different than a mandated initial transmitter amplitude specified by the communication protocol, the initial transmitter amplitude; and using the one or more new parameter values comprises setting a transmitted amplitude of the first communication device using the indication of the new initial transmitter amplitude for transmitting training signals during the training procedure.

Embodiment 20: The link establishment method of any of embodiments 11-19, wherein: communicating with the second communication device to negotiate the one or more new parameter values comprises receiving from the second communication device indications of new initial transmitter finite impulse response (FIR) filter coefficients that are different than mandated initial transmitter FIR filter coefficients specified by the communication protocol, the initial transmitter amplitude; and using the one or more new parameter values comprises setting coefficients of a transmitter FIR filter of the first communication device using the indications of the new initial transmitter FIR filter coefficients for transmitting training signals during the training procedure.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first communication device for use in a communication network operating according to a communication protocol, the communication protocol defining a link establishment procedure that includes i) a negotiating procedure and ii) a training procedure, wherein the communication protocol specifies mandated parameter values that are to be used for the link establishment procedure, the first communication device comprising:

physical layer (PHY) circuitry having a transceiver that is configured to transmit and receive via a communication link;

a negotiation controller configured to control the PHY circuitry to i) perform the negotiation procedure, and ii) during the negotiating procedure, control the PHY circuitry to communicate with a second communication device via the communication link to negotiate one or more new parameter values for the link establishment procedure that are different than one or more mandated parameter values specified by the communication protocol, the one or more new parameter values being relaxed as compared to the one or more mandated parameter values specified by the communication protocol, the one or more mandated parameter values including at least one default initial PHY parameter for starting the training procedure of the link establishment procedure, and the one or more new parameter values including at least one new initial PHY parameter for starting the training procedure of the link establishment procedure that is different as compared to the at least one default initial PHY parameter; and a training controller that is configured to control the PHY circuitry, during the link establishment procedure, to use the one or more new parameter values instead of using the one or more mandated parameter values specified by the communication protocol so that one or more constraints on the link establishment procedure mandated by the communication protocol are relaxed, including using the at least one new initial PHY parameter for starting the training procedure of the link establishment procedure instead of using the at least one default initial PHY parameter.

2. The first communication device of claim 1, wherein:
the negotiation controller is configured to control the PHY circuitry to communicate with the second communication device to negotiate a new timeout value that is longer than a mandated timeout value specified by the communication protocol, the mandated timeout value corresponding to a time duration by which an event of the link establishment procedure must occur; and
the training controller is configured to control the PHY circuitry to use the new timeout value so that more time is given for the event to occur as compared to the mandated timeout value specified by the communication protocol.

3. The first communication device of claim 2, wherein the negotiation controller is configured to:
control the PHY circuitry to transmit first timeout capability information to the second communication device;
receive second timeout capability information from the second communication device; and
select the new timeout value using the second timeout capability information.

4. The first communication device of claim 3, wherein the negotiation controller is configured to:
control the PHY circuitry to transmit, as an element of the first timeout capability information, a first maximum timeout value to the second communication device;
receive, as an element of the second timeout capability information, a second maximum timeout value from the second communication device; and
use the second maximum timeout value to select the new timeout value as being i) less than or equal to the first maximum timeout value, and ii) less than or equal to the second maximum timeout value.

5. The first communication device of claim 3, wherein the negotiation controller is configured to:
control the PHY circuitry to transmit, as elements of the first timeout capability information, i) a first maximum timeout value, and ii) a first proposed timeout value;
receive, as elements of the second timeout capability information, i) a second maximum timeout value, and ii) a second proposed timeout value; and
select the new timeout value as one of i) the first proposed timeout value, and ii) the second proposed timeout value, that is i) less than or equal to the first maximum timeout value, and ii) less than or equal to the second maximum timeout value.

6. The first communication device of claim 1, wherein the negotiation controller is configured to:
control the PHY circuitry to transmit the at least one new initial PHY parameter within a next page exchange defined by the Institute for Electrical and Electronics Engineers (IEEE) 802.3 Standard.

7. The first communication device of claim 6, wherein the negotiation controller is configured to:
control the PHY circuitry to transmit the at least one new initial PHY parameter in an unformatted next page information element defined by the IEEE 802.3 Standard.

8. The first communication device of claim 6, wherein the negotiation controller is configured to:

control the PHY circuitry to transmit the at least one new initial PHY parameter in a message next page information element defined by the IEEE 802.3 Standard.

9. The first communication device of claim 1, wherein:
the negotiation controller is configured to receive from the second communication device an indication of a new initial transmitter amplitude that is different than a mandated initial transmitter amplitude specified by the communication protocol; and
the training controller is configured to set a transmitted amplitude of the transceiver using the indication of the new initial transmitter amplitude for transmitting training signals during the training procedure.

10. The first communication device of claim 1, wherein:
the negotiation controller is configured to receive from the second communication device indications of new initial transmitter finite impulse response (FIR) filter coefficients that are different than mandated initial transmitter FIR filter coefficients specified by the communication protocol; and
the training controller is configured to set coefficients of a transmitter FIR filter of the transceiver using the indications of the new initial transmitter FIR filter coefficients for transmitting training signals during the training procedure.

11. A link establishment method in a communication network operating according to a communication protocol, the communication protocol defining a link establishment procedure that includes i) a negotiating procedure and ii) a training procedure, wherein the communication protocol specifies mandated parameter values that are to be used for the link establishment procedure, the method comprising:
performing, by the first communication device, the link establishment procedure, including: during the negotiating procedure, communicating, by the first communication device, with a second communication device via the communication link to negotiate one or more new parameter values for the link establishment procedure that are different than one or more mandated parameter values specified by the communication protocol, the one or more new parameter values being relaxed as compared to the one or more mandated parameter values specified by the communication protocol, the one or more mandated parameter values including at least one default initial PHY parameter for starting the training procedure of the link establishment procedure, and the one or more new parameter values including at least one new initial PHY parameter for starting the training procedure of the link establishment procedure that is different as compared to the at least one default initial PHY parameter; and
during the link establishment procedure, using, by the first communication device, the one or more new parameter values instead of using the one or more mandated parameter values specified by the communication protocol so that one or more constraints on the link establishment procedure mandated by the communication protocol are relaxed, including using the at least one new initial PHY parameter for starting the training procedure of the link establishment procedure instead of using the at least one default initial PHY parameter.

12. The link establishment method of claim 11, wherein:
communicating with the second communication device to negotiate the one or more new parameter values comprises communicating with the second communication device to negotiate a new timeout value that is longer than a mandated timeout value specified by the communication protocol, the mandated timeout value corresponding to a time duration by which an event of the link establishment procedure must occur; and using the one or more new parameter values comprises using the new timeout value so that more time is allowed for the event of the link establishment procedure to occur as compared to the mandated timeout value specified by the communication protocol.

13. The link establishment method of claim 12, wherein communicating with the second communication device to negotiate the new timeout value comprises:

transmitting, by the first communication device, first timeout capability information to the second communication device;

receiving, at the first communication device, second timeout capability information from the second communication device; and selecting, at the first communication device, the new timeout value using the second timeout capability information.

14. The link establishment method of claim 13, wherein:

transmitting the first timeout capability information to the second communication device comprises transmitting a first maximum timeout value to the second communication device;

receiving second timeout capability information from the second communication device comprises receiving a second maximum timeout value from the second communication device; and selecting the new timeout value comprises using the second maximum timeout value to select the new timeout value as being i) less than or equal to the first maximum timeout value, and ii) less than or equal to the second maximum timeout value.

15. The link establishment method of claim 13, wherein:

transmitting the first timeout capability information to the second communication device comprises transmitting to the second communication device i) a first maximum timeout value, and ii) a first proposed timeout value;

receiving second timeout capability information from the second communication device comprises receiving i) a second maximum timeout value, and ii) a second proposed timeout value; and selecting the new timeout value comprises selecting the new timeout value as one of i) the first proposed timeout value, and ii) the second proposed timeout value, that is i) less than or equal to the first maximum timeout value, and ii) less than or equal to the second maximum timeout value.

16. The link establishment method of claim 11, wherein communicating with the second communication device via the communication link to negotiate the one or more new parameter values comprises:

transmitting the at least one new initial PHY parameter to the second communication device within a next page exchange defined by the Institute for Electrical and Electronics Engineers (IEEE) 802.3 Standard.

17. The link establishment method of claim 16, wherein:

transmitting the first timeout capability information within the next page exchange comprises transmitting the first timeout capability information in a first unformatted next page information element defined by the IEEE 802.3 Standard.

18. The link establishment method of claim 16, wherein:

transmitting the first timeout capability information within the next page exchange comprises transmitting the first timeout capability information in a first message next page information element defined by the IEEE 802.3 Standard.

19. The link establishment method of claim 11, wherein:

communicating with the second communication device to negotiate the one or more new parameter values comprises receiving from the second communication device an indication of a new initial transmitter amplitude that is different than a mandated initial transmitter amplitude specified by the communication protocol, the initial transmitter amplitude; and using the one or more new parameter values comprises setting a transmitted amplitude of the first communication device using the indication of the new initial transmitter amplitude for transmitting training signals during the training procedure.

20. The link establishment method of claim 11, wherein:

communicating with the second communication device to negotiate the one or more new parameter values comprises receiving from the second communication device indications of new initial transmitter finite impulse response (FIR) filter coefficients that are different than mandated initial transmitter FIR filter coefficients specified by the communication protocol, the initial transmitter amplitude; and using the one or more new parameter values comprises setting coefficients of a transmitter FIR filter of the first communication device using the indications of the new initial transmitter FIR filter coefficients for transmitting training signals during the training procedure.

\* \* \* \* \*